(12) United States Patent
Katsuragi et al.

(10) Patent No.: US 11,296,573 B2
(45) Date of Patent: Apr. 5, 2022

(54) STATOR WINDING FOR ROTATING ELECTRIC MACHINE, AND MANUFACTURING METHOD THEREFOR

(71) Applicant: Mitsubishi Electric Corporation, Tokyo (JP)

(72) Inventors: Kota Katsuragi, Tokyo (JP); Shinji Kawaguchi, Tokyo (JP); Kohei Yasuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 129 days.

(21) Appl. No.: 16/827,920

(22) Filed: Mar. 24, 2020

(65) Prior Publication Data
US 2020/0328647 A1  Oct. 15, 2020

(30) Foreign Application Priority Data

Apr. 10, 2019 (JP) .............................. JP2019-074476

(51) Int. Cl.
*H02K 3/50* (2006.01)
*H02K 15/00* (2006.01)
*H02K 3/38* (2006.01)

(52) U.S. Cl.
CPC ............. *H02K 3/50* (2013.01); *H02K 3/38* (2013.01); *H02K 15/0062* (2013.01); *H02K 2203/06* (2013.01)

(58) Field of Classification Search
CPC ............ H02K 3/50; H02K 3/04; H02K 1/146; H02K 1/16; H02K 3/12; H02K 3/28
See application file for complete search history.

(56) References Cited

U.S. PATENT DOCUMENTS 7,615,906 B2 * 11/2009 Sakai .................. H02K 3/12
  29/596
10,348,148 B2 * 7/2019 Takei .................. H02K 3/28
(Continued)

FOREIGN PATENT DOCUMENTS

JP  2003-116242 A  4/2003
JP  2009-81980 A   4/2009
(Continued)

OTHER PUBLICATIONS

Communication dated Jun. 2, 2020, from the Japanese Patent Office in Application No. 2019-074476.

*Primary Examiner* — Tran N Nguyen
*Assistant Examiner* — Leda T Pham
(74) *Attorney, Agent, or Firm* — Sughrue Mion, PLLC; Richard C. Turner

(57) ABSTRACT

A stator winding for a rotating electric machine includes: a plurality of lead wires each including a conductor and an insulating film provided on side surfaces of the conductor; and a joining portion configured to join terminal portions of the plurality of lead wires to each other. The plurality of lead wires each includes: a conductor exposure portion provided at a portion of the terminal portion at which the terminal portions of the plurality of lead wires face each other, has the conductor exposed thereat, and has the joining portion connected thereto; and an insulating film remainder portion, provided at a portion of the terminal portion of the lead wire excluding the conductor exposure portion, and has the conductor covered with the insulating film, and a portion of the insulating film in the insulating film remainder portion is provided in a periphery of the joining portion.

8 Claims, 16 Drawing Sheets

(56) References Cited

U.S. PATENT DOCUMENTS

| | | | |
|---|---|---|---|
| 10,763,730 B2* | 9/2020 | Hashimoto | H02K 3/50 |
| 10,992,197 B2* | 4/2021 | Kaji | H01F 27/32 |
| 2002/0033649 A1* | 3/2002 | Oohashi | H02K 3/50 |
| | | | 310/184 |
| 2003/0067239 A1 | 4/2003 | Nakamura | |
| 2016/0190891 A1* | 6/2016 | Masugi | H02K 3/38 |
| | | | 310/201 |
| 2017/0346358 A1* | 11/2017 | Fukuda | H02K 15/0081 |
| 2018/0248430 A1* | 8/2018 | Umesaki | H02K 15/0421 |

FOREIGN PATENT DOCUMENTS

| | | |
|---|---|---|
| JP | 2014-36562 A | 2/2014 |
| WO | 2016/103989 A1 | 6/2016 |

* cited by examiner

STATOR WINDING FOR ROTATING ELECTRIC MACHINE, AND MANUFACTURING METHOD THEREFOR

BACKGROUND OF THE INVENTION

1. Field of the Invention

The present invention relates to a stator winding for a rotating electric machine in which conductors of a plurality of lead wires are electrically connected to each other by joining portions, and to a manufacturing method therefor.

2. Description of the Related Art

There has hitherto been known a stator winding for a rotating electric machine, which includes a plurality of lead wires and joining portions. The plurality of lead wires each include a conductor and an insulating film provided on side surfaces of the conductor. The joining portions are configured to electrically connect the conductors of the plurality of lead wires. Terminal portions of the plurality of lead wires each have the conductor exposed therefrom to form a conductor exposure portion having the joining portion connected thereto (for example, see Japanese Patent No. 6448664).

SUMMARY OF THE INVENTION

However, the entirety of the terminal portion of the lead wire form the conductor exposure portion. As a result, there is a problem in that a dimension of the stator winding in an axial direction of the rotating electric machine is large.

The present invention has been made to solve the problem described above, has an object to provide a stator winding for a rotating electric machine which is capable of reducing a dimension of the stator winding in an axial direction of a rotating electric machine, and a manufacturing method therefor.

According to one embodiment of the present invention, provided is a stator winding for a rotating electric machine, including: a plurality of lead wires each including a conductor and an insulating film provided on side surfaces of the conductor; and a joining portion configured to join terminal portions of the plurality of lead wires to each other, to thereby electrically connect the conductors of the plurality of lead wires, wherein the plurality of lead wires each include: a conductor exposure portion, which is provided at a portion of the terminal portion at which the terminal portions of the plurality of lead wires face each other, has the conductor exposed thereat, and has the joining portion connected thereto; and an insulating film remainder portion, which is provided at a portion of the terminal portion of the lead wire excluding the conductor exposure portion, and has the conductor covered with the insulating film, and wherein a portion of the insulating film in the insulating film remainder portion is provided in a periphery of the joining portion.

According to the stator winding for a rotating electric machine of the present invention, it is possible to reduce a dimension of the stator winding in an axial direction of a rotating electric machine, and a manufacturing method therefor.

DESCRIPTION OF THE EMBODIMENTS

First Embodiment

Figure 1:
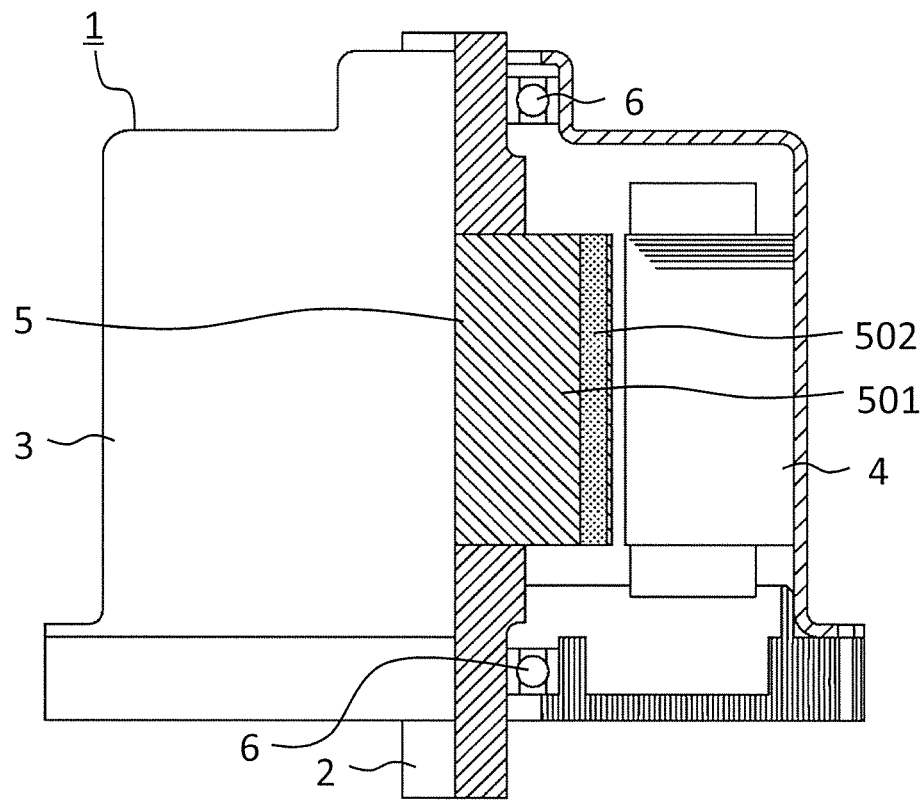
FIG. 1 is a partial sectional view for illustrating a rotating electric machine according to a first embodiment of the present invention.

FIG. 1 is a partial sectional view for illustrating a rotating electric machine according to a first embodiment of the present invention. A rotating electric machine 1 includes a shaft 2 configured to transmit torque to an outside. In this example, an axial direction corresponds to a direction along the shaft 2, a radial direction corresponds to a radial direction with the shaft 2 being a center, and a circumferential direction corresponds to a circumferential direction with the shaft 2 being a center. In FIG. 1, the rotating electric machine 1 is illustrated in sectional view on a right side with respect to a plane passing through the center of the shaft 2 and extending along the shaft 2, and is illustrated in front view on a left side.

The rotating electric machine 1 includes a housing 3, a stator 4, a rotor 5, and a plurality of bearings 6. The stator 4 is supported on the housing 3, and is configured to generate a rotational magnetic field. The rotor 5 is provided on a radially inner side with respect to the stator 4. The plurality of bearings 6 are supported on the housing 3, and are configured to rotatably support the shaft 2.

The rotor 5 is supported on the housing 3 through intermediation of the shaft 2 and the bearings 6. The rotor 5 rotates relative to the stator 4 in the circumferential direction. A gap is defined between the stator 4 and the rotor 5 in the radial direction. The rotor 5 is fixed to the shaft 2, and includes a rotor core 501 and a plurality of permanent magnets 502. The rotor core 501 allows magnetic fluxes to pass therethrough. The plurality of permanent magnets 502 are embedded in the rotor core 501.

Figure 2:
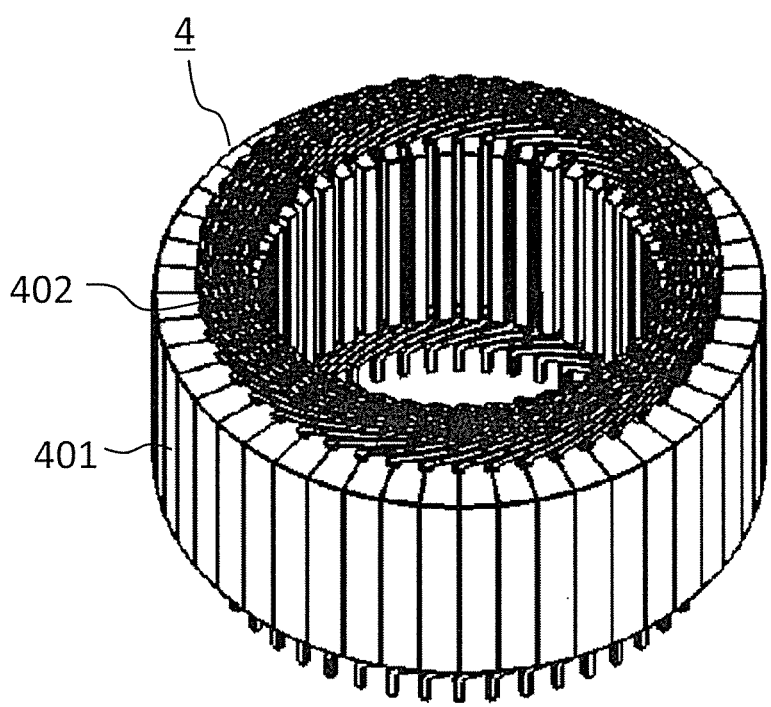
FIG. 2 is a perspective view for illustrating a stator of FIG. 1.

FIG. 2 is a perspective view for illustrating the stator 4 of FIG. 1. The stator 4 includes a stator core 401 and a plurality of stator windings 402. The stator core 401 has an annular shape. The plurality of stator windings 402 are supported on the stator core 401, and are configured to generate a magnetic field through feeding of a current therethrough. The stator core 401 has a plurality of slot portions arranged at equal intervals in the circumferential direction. The stator windings 402 are inserted into the slot portions. The stator windings 402 of different phases are insulated from one another. The stator core 401 and the stator windings 402 are insulated from one another.

Figure 3:
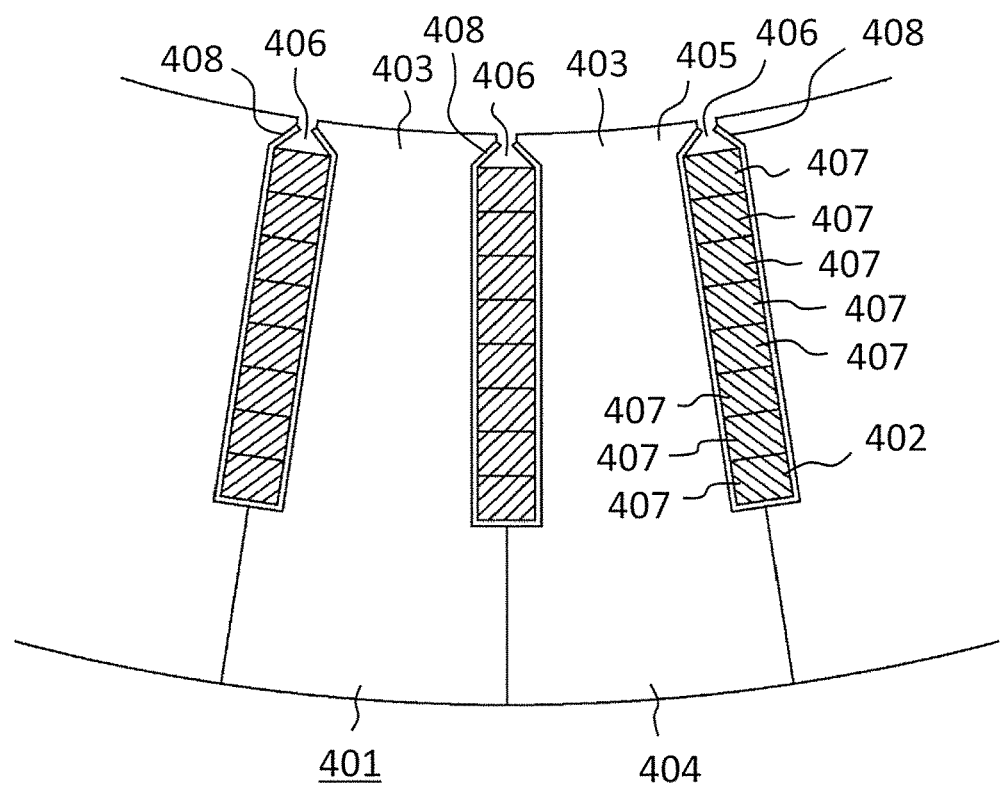
FIG. 3 is a sectional view for illustrating main parts of the stator of FIG. 2.

FIG. 3 is a sectional view for illustrating main parts of the stator 4 of FIG. 2. The stator core 401 includes a plurality of core blocks 403. In this example, the number of the core blocks 403 is forty-eight. The plurality of core blocks 403 are arranged in the circumferential direction. The core blocks 403 each include a plurality of electromagnetic steel sheets laminated in the axial direction. The number of the electromagnetic steel sheets is the set number.

The core blocks 403 each include a core back portion 404 and a tooth portion 405. The core back portion 404 has an arc-shaped cross section. The tooth portion 405 extends from a radially inner surface of the core back portion 404 toward the radially inner side.

In the stator core 401, distal end portions of the tooth portions 405 are oriented toward the radially inner side, and circumferential side surfaces of the core back portions 404 adjacent to each other in the circumferential direction are held in abutment against each other so that the forty-eight core back portions 404 are integrated. The slot portions 406 are each formed by core blocks 403 adjacent to each other in the circumferential direction. The slot portions 406 are arranged so as to open toward an inner side in the circumferential direction. The plurality of slot portions 406 are arranged at an equiangular pitch in the circumferential direction.

The stator windings 402 each have a linear portion 407 having a rectangular cross section. A plurality of linear portions 407 are arranged in each of the slot portions 406.

The stator 4 further includes a plurality of insulating sheets 408 provided in the slot portions 406, respectively. The insulating sheets 408 are each provided between the stator core 401 and the linear portions 407. The insulating sheets 408 are configured to insulate the stator core 401 and the stator windings 402 from one another.

Figure 4:
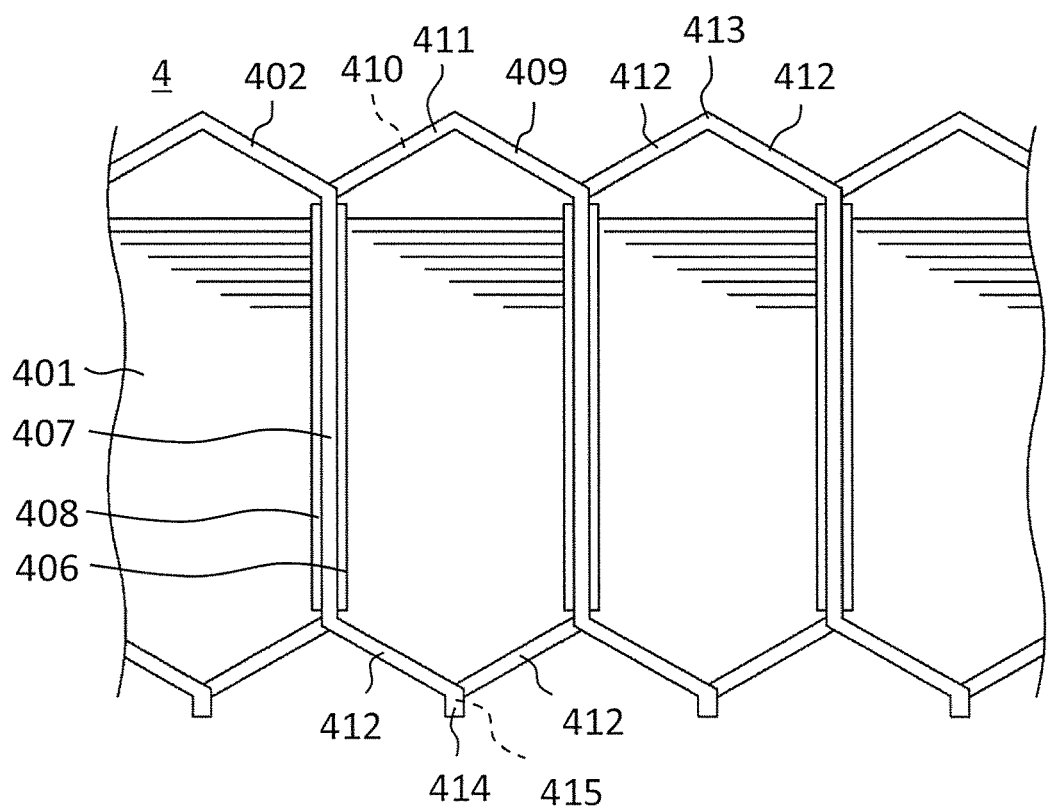
FIG. 4 is a view for illustrating a radially inner portion of the stator of FIG. 3 as viewed toward a radially outer side.

FIG. 4 is a view for illustrating a radially inner portion of the stator 4 of FIG. 3 as viewed toward the radially outer side. The stator windings 402 each include a lead wire 409. The lead wire 409 includes a conductor 410 and an insulating film 411 provided on side surfaces of the conductor 410. The conductor 410 is made of oxygen-free copper or oxygen-containing copper.

The linear portions 407 are arranged so as to extend in the axial direction. The stator windings 402 each include oblique side portions 412 and a top portion 413. The oblique side portions 412 are provided at both end portions of the linear portions 407 in the axial direction, and are provided so as to incline with respect to the axial direction. The top portion 413 connects adjacent oblique side portions 412.

Both end portions of the insulating sheet 408 in the axial direction are arranged so as to extend toward the outer side in the axial direction with respect to the both end portions of the stator core 401 in the axial direction. In other words, the insulating sheet 408 projects from the stator core 401 toward the outer side in the axial direction. With this configuration, both surfaces of the stator core 401 in the axial direction are insulated from the stator windings 402.

The stator windings 402 each include a terminal portion 414 and a joining portion 415. The terminal portion 414 is provided at the oblique side portion 412 located on one side in the axial direction with respect to the linear portion 407, and extends in the axial direction. The joining portion 415 is configured to join adjacent terminal portions 414 to each other. The linear portions 407, the oblique side portions 412, the top portion 413, and the terminal portion 414 are each formed of the lead wire 409. The terminal portion 414 is connected to an end portion of the oblique side portion 412 on a side opposite to the linear portion 407 side. The terminal portion 414 is provided so as to extend from the end portion of the oblique side portion 412 toward the outer side in the axial direction. The joining portion 415 is configured to join the terminal portions 414 to each other, which are connected through intermediation of oblique side portions 412 to linear portions 407 inserted into slot portions 406 adjacent to each other in the circumferential direction. The terminal portions 414 joined to each other are arranged in the radial direction. The joining portion 415 is located between the terminal portions 414 joined to each other.

Figure 5:
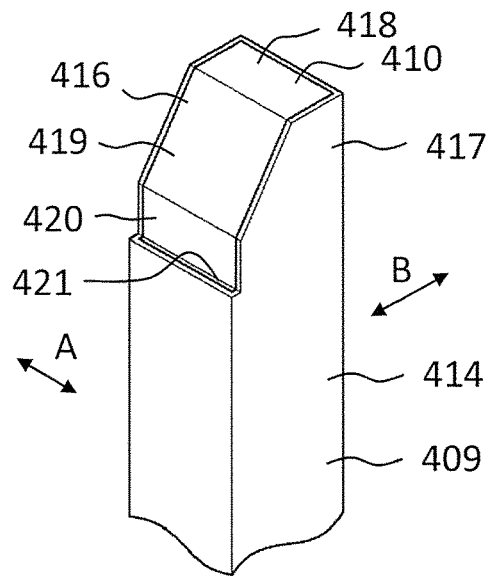
FIG. 5 is a perspective view for illustrating a terminal portion of FIG. 4.

FIG. 5 is a perspective view for illustrating the terminal portion 414 of FIG. 4. The terminal portion 414 has the conductor 410 partially exposed thereat. The terminal portion 414 is a distal end portion of the lead wire 409. The terminal portion 414 includes a conductor exposure portion 416 and an insulating film remainder portion 417. The conductor exposure portion 416 has the conductor 410 exposed thereat. The insulating film remainder portion 417 is provided at a portion of the terminal portion 414 excluding the conductor exposure portion 416, and has the conductor 410 covered with the insulating film 411.

The conductor exposure portion 416 includes a distal end surface 418, a chamfered portion 419, a planar portion 420, and a step portion 421. The planar portion 420 is provided on a root side with respect to the chamfered portion 419. The step portion 421 is provided on a root side with respect to the planar portion 420. In this example, the root side corresponds to an inner side in the axial direction. The chamfered portions 419 of the conductor exposure portions 416, which are provided at portions of the terminal portions 414 facing each other, are formed so as to separate away from each other as extending toward the distal end side. The planar portions 420 of the conductor exposure portions 416, which are provided at portions of the terminal portions 414 facing each other, are opposed to each other. The step portion 421 is oriented toward the distal end side. In this example, the distal end side corresponds to an outer side in the axial direction.

The insulating film remainder portion 417 includes portions oriented in a width direction A of the lead wire 409 and a portion on a side opposite to the conductor exposure portion 416 of the lead wire 409 in a depth direction B. In this example, the width direction A corresponds to a width direction of the lead wire 409 when viewed in a direction perpendicular to the planar portion 420. Moreover, in this example, the depth direction B corresponds to the direction perpendicular to the planar portion 420 and corresponds to an opposing direction in which the planar portions 420 are opposed to each other. The portions of the conductor 410 oriented in the width direction A are covered with the insulating film 411, and the portion of the conductor 410 oriented toward the side opposite to the conductor exposure portion 416 in the depth direction B is covered with the insulating film 411.

Figure 6:
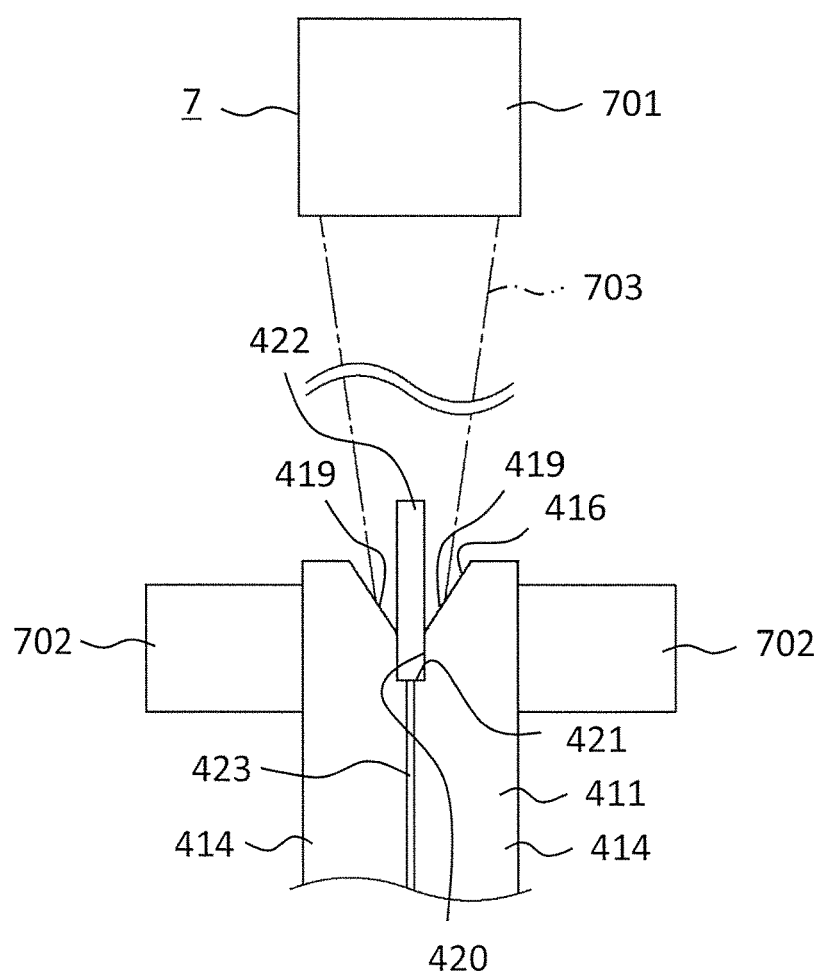
FIG. 6 is a view for illustrating a state in which two terminal portions are joined to each other through laser radiation.
Figure 7:
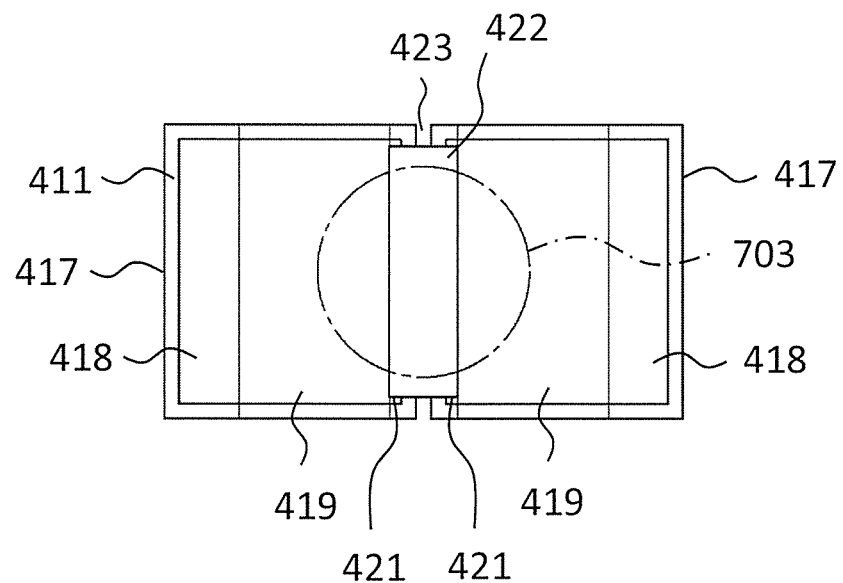
FIG. 7 is a plan view for illustrating the two terminal portions of FIG. 6.

FIG. 6 is a view for illustrating a state in which two terminal portions 414 are joined to each other through laser radiation. FIG. 7 is a plan view for illustrating the two terminal portions 414 of FIG. 6. The conductor exposure portions 416 are arranged at opposing portions of the two terminal portions 414. A joining member 422 is provided between the planar portions 420 of the conductor exposure portions 416 opposed to each other. A melting point of the joining member 422 is lower than a melting point of the conductor 410.

A production device 7 configured to produce the stator windings 402 includes a laser head 701 and chuck portions 702. The laser head 701 emits a laser light 703. The chuck portions 702 are arranged so as to be opposed to portions of the terminal portions 414 on sides opposite to the conductor exposure portions 416 in the depth direction B. The chuck portions 702 pressurizes and holds the two terminal portions 414 and the joining member 422 in the depth direction B. In other words, under a state in which the joining member 422 is sandwiched between the two terminal portions 414 in the depth direction B, the chuck portions 702 pressurizes and holds the two terminal portions 414 in the depth direction B. The depth direction B is a direction in which the two terminal portions 414 approach each other.

The laser light 703 emitted from the laser head 701 has a condensing property. The two chamfered portions 419 of the terminal portions 414 and the joining member 422 are irradiated with the laser light. In such a manner, the chamfered portions 419 and the joining member 422 are heated.

Figure 8:
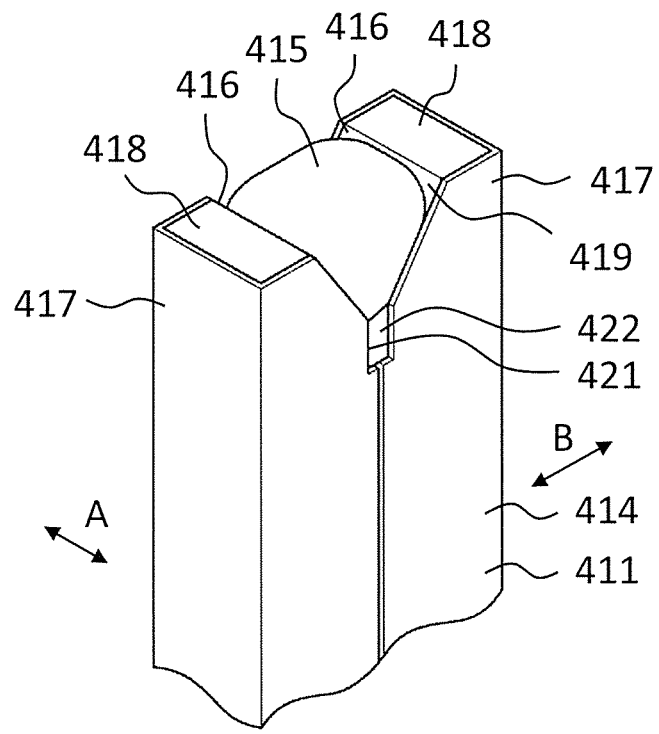
FIG. 8 is a perspective view for illustrating the two terminal portions joined to each other.
Figure 9:
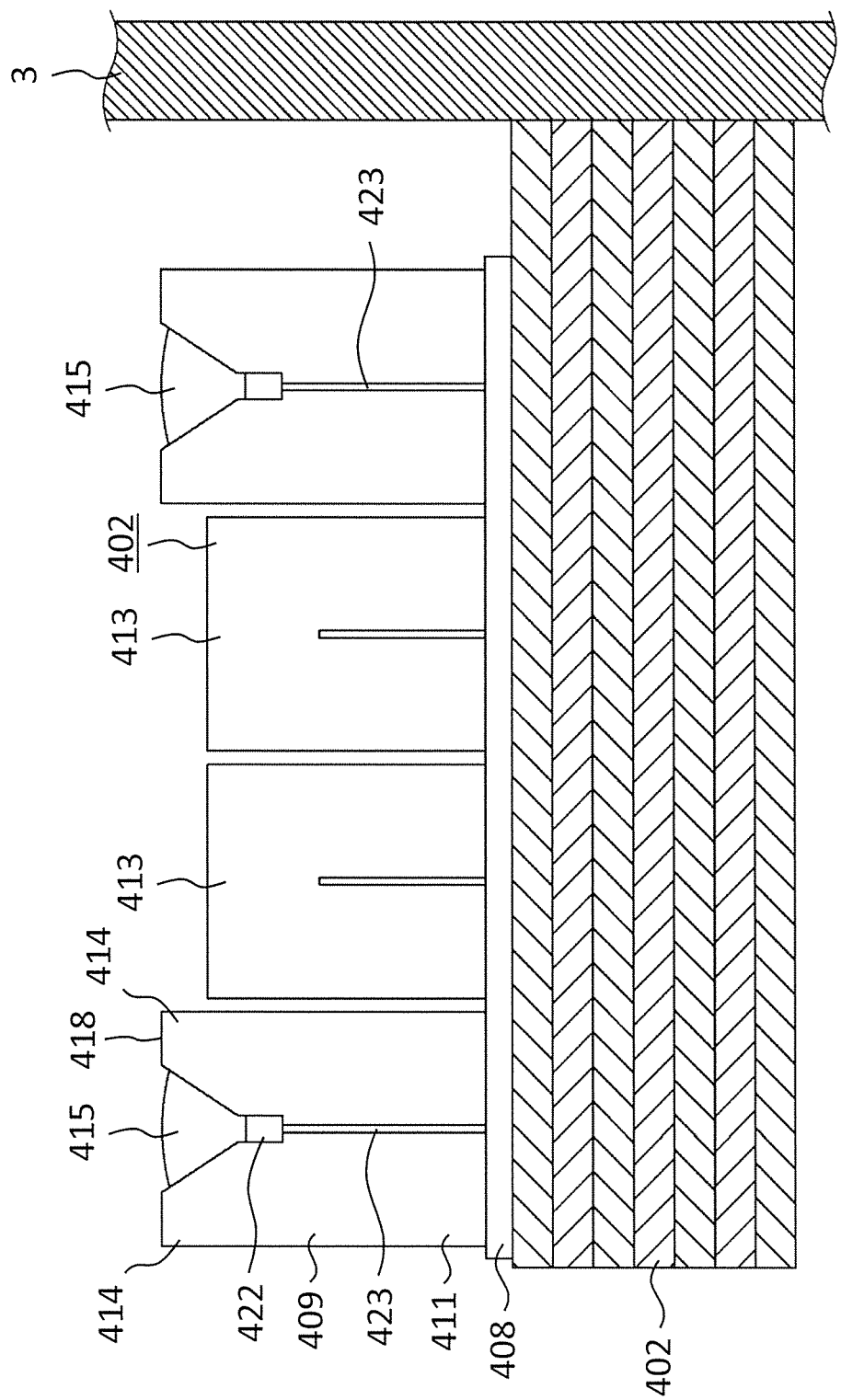
FIG. 9 is a sectional view for illustrating main parts of the stator including the two terminal portions joined to each other.

FIG. 8 is a perspective view for illustrating the two terminal portions 414 joined to each other. FIG. 9 is a sectional view for illustrating main parts of the stator 4 including the two terminal portions 414 joined to each other. Through the heating of the chamfered portions 419 and the joining member 422, the joining portion 415 is formed between the two terminal portions 414. As a result, the joining portion 415 is connected to the chamfered portions 419 so that the joining portion 415 is provided over the chamfered portions 419. Moreover, through the formation of the joining portion 415 between the two terminal portions 414, the two terminal portions 414 are joined to each other so that the conductors 410 of the two terminal portions 414 are electrically connected to each other. The conductors 410 of the two terminal portions 414 are electrically connected to each other by brazing. The joining portion 415 is an overlay alloy layer formed of alloys of the joining member 422 and the conductors 410.

With the two terminal portions 414 and the joining member 422 being pressurized and held by the chuck portions 702, formation of a gap between the terminal portions 414 and the joining member 422 is prevented. Such a configuration prevents the phenomenon in which the laser light 703 having leaked out through the gap between the terminal portions 414 and the joining member 422 strikes a portion of the insulating film 411 located on the root side with respect to the planar portion 420. As a result, damage on the portion of the insulating film 411 located on the root side with respect to the planar portion 420 is prevented.

The joining portion 415 is formed through the brazing through use of the joining member 422. The joining member 422 which has not been melted is located between the planar portions 420 of the two terminal portions 414. An axial height position of the terminal portions 414 joined to each other with respect to the stator core 401 is set to a position at which a creepage distance and a clearance distance are secured between the terminal portion 414 and the top portion 413 of the stator winding 402 adjacent to the terminal portion 414 in the radial direction. With this, phase-to-phase insulation between the top portion 413 and the terminal portions 414 as well as the joining portion 415 is assured.

A gap 423 is defined between portions of the two lead wires 409, which are provided on the root side with respect to the joining portion 415 and have the conductors 410 covered with the insulating film 411. With this configuration, when the two terminal portions 414 are joined to each other, transfer of heat generated in one terminal portion 414 to another terminal portion 414 through the insulating film 411 is prevented. Accordingly, damage on the insulating film 411 is reduced.

Figure 10:
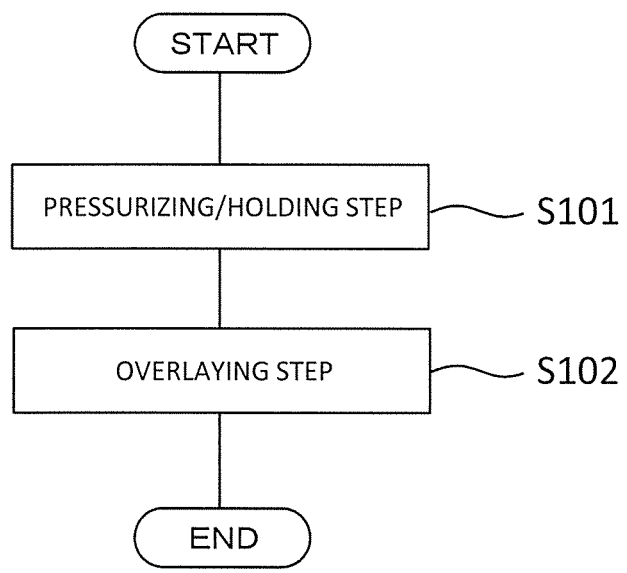
FIG. 10 is a flowchart for illustrating a manufacturing method for a stator winding for a rotating electric machine according to the first embodiment of the present invention.

Next, description is made of a manufacturing method for the stator winding 402 with the two terminal portions 414 joined to each other. FIG. 10 is a flowchart for illustrating a manufacturing method for the stator winding 402 of the rotating electric machine 1 according to the first embodiment of the present invention. First, in Step S101, a pressurizing/holding step is performed. In the pressurizing/holding step, the joining member 422 is provided between the conductor exposure portions 416 of the two terminal portions 414, and the two terminal portions 414 are pressurized and held in the direction in which the two terminal portions 414 approach each other.

After that, in Step S102, an overlaying step is performed. In the overlaying step, the joining member 422 is irradiated with the laser light 703, thereby forming the joining portion 415 at the conductor exposure portions 416. As a result, the two terminal portions 414 are joined to each other, and the conductors 410 of the two terminal portions 414 are electrically connected to each other. Then, the procedure for manufacturing the stator winding 402 is terminated.

As described above, according to the stator winding 402 for the rotating electric machine 1 of the first embodiment of the present invention, a portion of the insulating film 411 in the insulating film remainder portion 417 is provided in a periphery of the joining portion 415. With this, a dimension of the terminal portion 414 in the axial direction can be reduced. As a result, a dimension of the stator winding 402 in the axial direction can be reduced. Moreover, through the reduction of the dimension of the stator winding 402 in the axial direction, the rotating electric machine 1 can be downsized. Moreover, through the reduction of the dimension of the stator winding 402 in the axial direction, the amount of use of the conductor 410 for the stator winding 402 can be reduced. As a result, the rotating electric machine 1 can be reduced in cost.

Moreover, the joining portion 415 is an overlay alloy layer formed of alloys of the conductors 410 and the joining member 422 having a melting point lower than a melting point of the conductors 410 of the terminal portions 414. With this, the amount of heat applied to the terminal portions 414 by the laser light 703 can be reduced. As a result, damage on the insulating film 411 can be reduced.

Moreover, the joining portion 415 is provided over the chamfered portions 419 of the conductor exposure portions 416 facing each other. With this, the two terminal portions 414 can be joined, and the conductors 410 of the two terminal portions 414 can be electrically connected to each other.

Moreover, the conductor exposure portion 416 includes the planar portion 420 and the step portion 421. With this, the joining member 422 can be stably provided between the two terminal portions 414.

Moreover, the gap 423 is defined between portions of the two lead wires 409 adjacent to the root side with respect to the joining portion 415. With this, damage on the insulating film 411 provided at the portions of the plurality of lead wires 409 adjacent to the root side with respect to the joining portion 415 can be prevented.

Moreover, according to the manufacturing method for the stator winding 402 for the rotating electric machine 1 of the first embodiment of the present invention, the chamfered portions 419 are irradiated with the laser light 703 having the condensing property. With this, irradiation of the insulating film 411 with the laser light 703 is prevented. As a result, damage on the insulating film 411 can be reduced.

Moreover, the chamfered portions 419 are irradiated with the laser light 703. With this, multiple reflection of the laser light 703 occurs between the chamfered portions 419 and the joining member 422. With this, the chamfered portions 419 and the joining member 422 are irradiated with the reflected laser light 703 a plurality of times. Thus, output of the laser head 701 emitting the laser light 703 can be reduced. As a result, the cost of the production device 7 configured to produce the stator windings 402 can be reduced.

Moreover, it is not required that all of the insulating film 411 of the terminal portion 414 be removed. With this, the cost of the production device 7 configured to produce the stator windings 402 can be reduced.

In the first embodiment, description is made of the configuration of the rotating electric machine 1 in which the stator windings 402, which are formed of the plurality of lead wires 409 each having a hexagonal shape and are wound around the tooth portions 405, are arranged in the circumferential direction. However, the present invention is not limited to such a configuration. For example, the rotating electric machine 1 may have a configuration in which the stator windings 402, which are formed of corrugated lead wires or U-shaped lead wires and are wound around the tooth portions 405, may be arranged in the circumferential direction.

Moreover, in the first embodiment, description is made of the configuration in which the joining member 422 is irradiated with the laser light 703. However, the present invention is not limited to such a configuration. For example, the joining member 422 may be irradiated with an electron beam having a condensing property.

Second Embodiment

Figure 11:
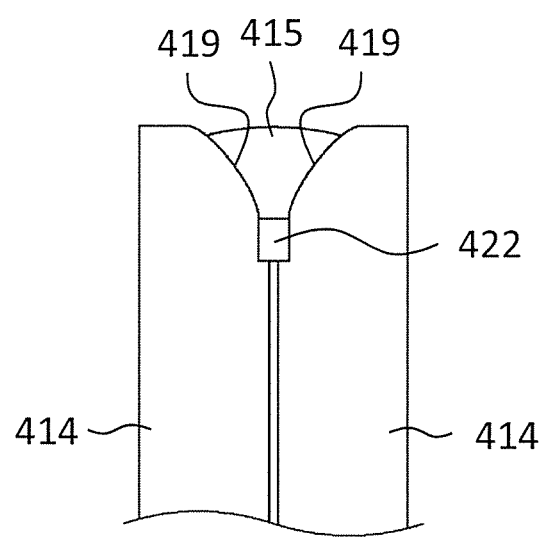
FIG. 11 is a front view for illustrating main parts of a stator winding for a rotating electric machine according to a second embodiment of the present invention.

FIG. 11 is a front view for illustrating main parts of a stator winding for a rotating electric machine according to a second embodiment of the present invention. In FIG. 11, the two terminal portions 414, the joining portion 415, and the joining member 422 are illustrated. The chamfered portions 419 each have a curved shape formed such that a center portion of the chamfered portion 419 in the height direction projects toward the joining portion 415 side. Other configurations are the same as those of the first embodiment.

As described above, according to the stator winding 402 for the rotating electric machine 1 of the second embodiment of the present invention, the chamfered portions 419 each have a curved shape formed such that a center portion of the chamfered portion 419 in the height direction projects toward the joining portion 415 side. With this, an angle formed between the root-side portion of the chamfered portion 419 and the joining member 422 can be reduced. Thus, the multiple reflection of the laser light 703 is more likely to occur between the chamfered portion 419 and the joining member 422. As a result, output of the laser head 701 emitting the laser light 703 can be reduced, and the cost of the production device 7 configured to produce the stator windings 402 can be reduced.

Third Embodiment

Figure 12:
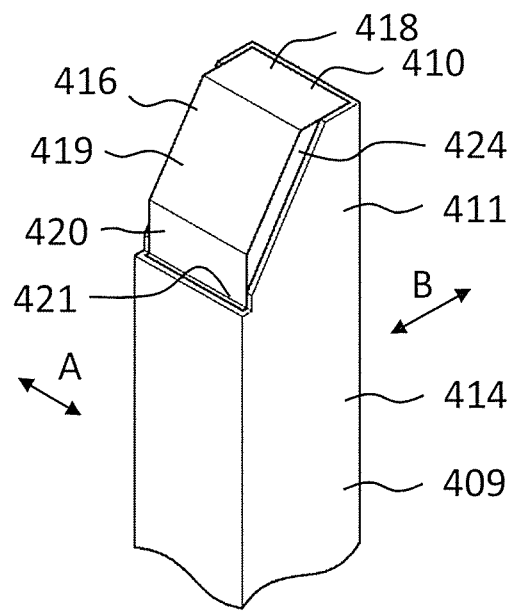
FIG. 12 is a perspective view for illustrating a terminal portion of a stator winding for a rotating electric machine according to a third embodiment of the present invention.
Figure 13:
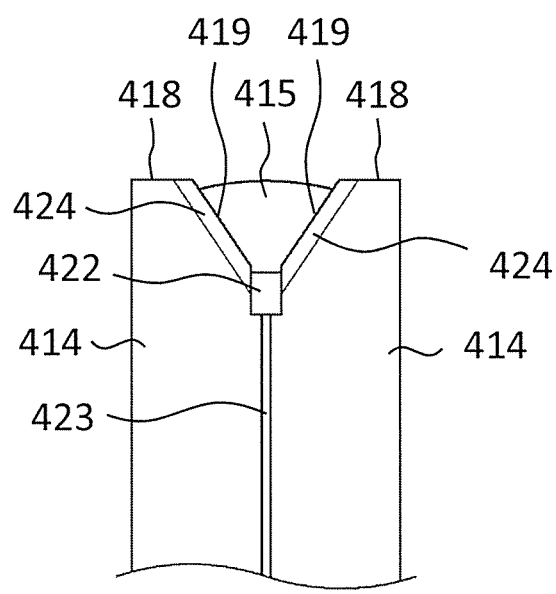
FIG. 13 is a front view for illustrating two terminal portions joined to each other.

FIG. 12 is a perspective view for illustrating a terminal portion of a stator winding for a rotating electric machine according to a third embodiment of the present invention. FIG. 13 is a front view for illustrating the two terminal portions joined to each other. The terminal portions 414 each include chamfered portion side surface conductor exposure portions 424, which are provided at portions adjacent to the chamfered portion 419 in the depth direction B when viewed in the width direction A and have the conductor 410 exposed thereat. In other words, portions of the insulating film 411 adjacent to the chamfered portion 419 in the depth direction B when viewed in the width direction A are removed from the conductor 410. Other configurations are the same as those of the first embodiment or the second embodiment.

As described above, according to the stator winding 402 for the rotating electric machine 1 of the third embodiment of the present invention, the terminal portion 414 includes the chamfered portion side surface conductor exposure portion 424, which are provided at portions adjacent to the chamfered portion 419 in the depth direction B when viewed in the width direction A and have the conductor 410 exposed thereat. With this, damage on the insulating film 411 caused by application of heat to the chamfered portion 419 can be prevented.

Figure 14:
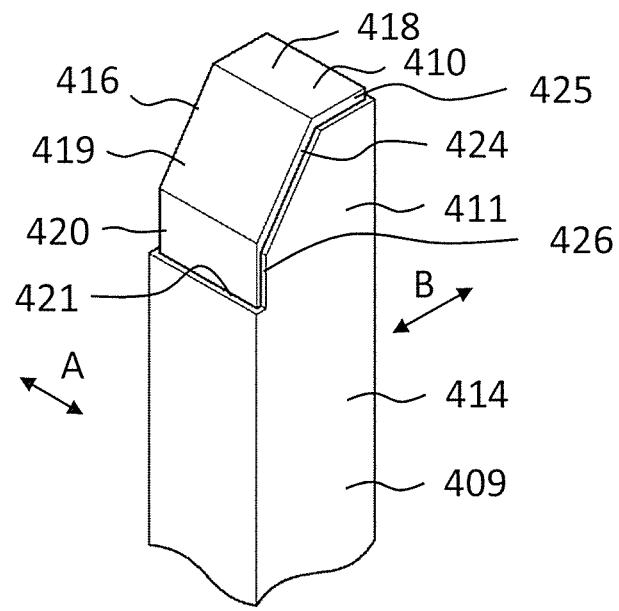
FIG. 14 is a perspective view for illustrating a modification example of the terminal portion.
Figure 15:
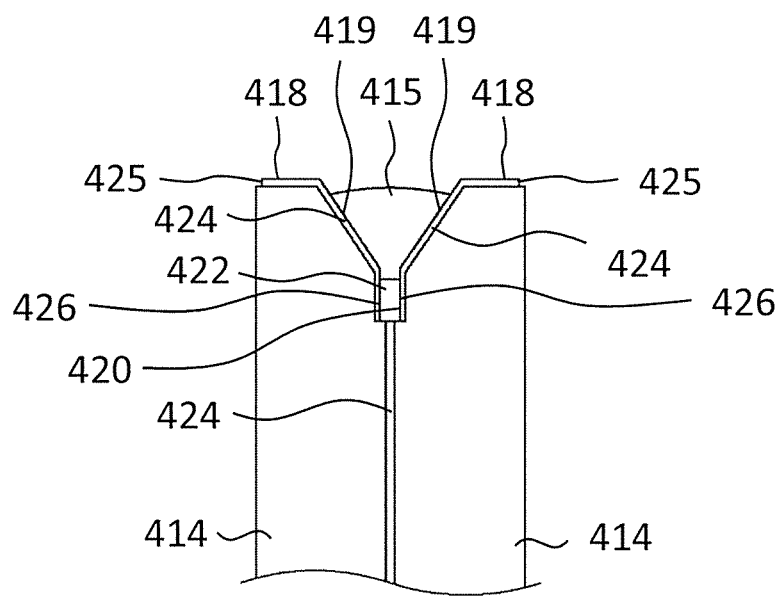
FIG. 15 is a front view for illustrating a modification example of two terminal portions joined to each other.

In the third embodiment, description is made of the configuration in which the insulating film 411 at the portions of the terminal portion 414 adjacent to each other in the depth direction B with respect to the chamfered portion 419 when viewed in the width direction A is removed from the conductor 410. However, the present invention is not limited to this configuration. As illustrated in FIG. 14 and FIG. 15, the terminal portion 414 may include axial end portion side surface conductor exposure portions 425 at which portions of the insulating film 411 adjacent to the distal end surface 418 in the axial direction are removed from the conductor 410. Moreover, as illustrated in FIG. 14 and FIG. 15, the terminal portion 414 may include planar portion side surface conductor exposure portions 426 at which portions of the insulating film 411 adjacent to the planar portion 420 in the depth direction B when viewed in the width direction A are removed from the conductor 410. In those cases, damage on the insulating film 411 can be further prevented. The side surface conductor exposure portion includes the chamfered portion side surface conductor exposure portions 424, the axial end portion side surface conductor exposure portions 425, and the planar portion side surface conductor exposure portions 426.

Fourth Embodiment

Figure 16:
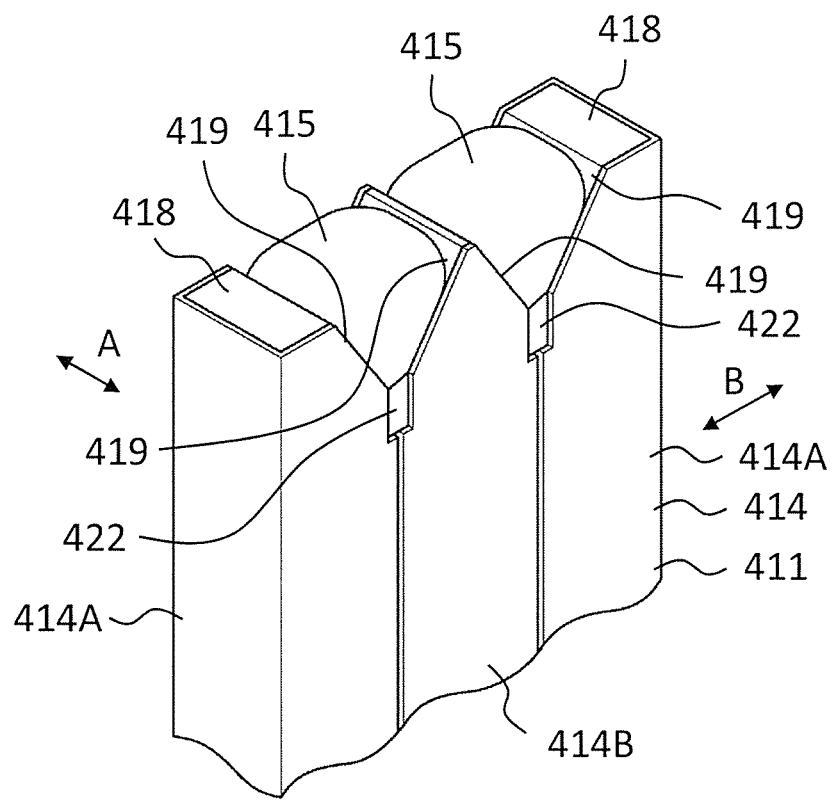
FIG. 16 is a perspective view for illustrating main parts of a stator winding for a rotating electric machine according to a fourth embodiment of the present invention.
Figure 17:
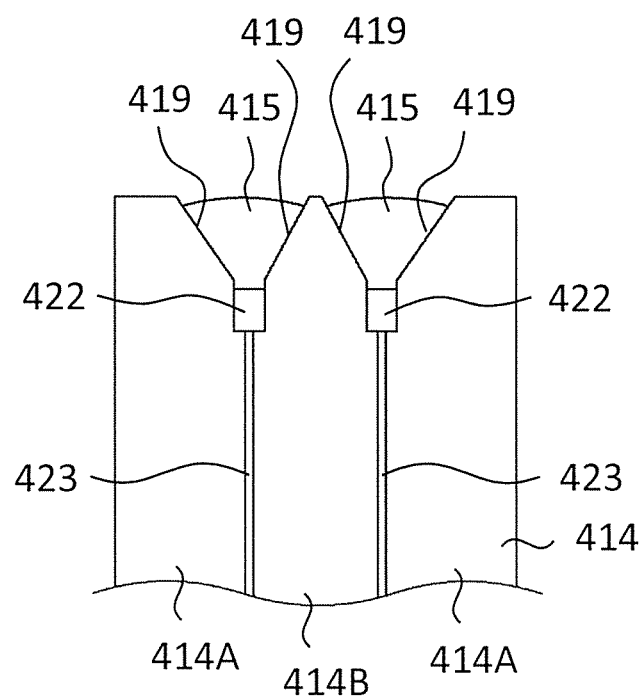
FIG. 17 is a front view for illustrating main parts of the stator winding of FIG. 16.

FIG. 16 is a perspective view for illustrating main parts of the stator winding 402 for the rotating electric machine 1 according to a fourth embodiment of the present invention. FIG. 17 is a front view for illustrating main parts of the stator winding 402 of FIG. 16. Three terminal portions 414 are arranged in the radial direction. Two terminal portions 414 among the three terminal portions 414, which are arranged at both end portions in the arrangement direction, each include one conductor exposure portion 416 similarly to the first embodiment. One terminal portion 414 among the three terminal portions 414, which is arranged at a center portion in the arrangement direction, includes two conductor exposure portions 416.

The two terminal portions 414 among the three terminal portions 414, which are arranged at the both end portions in the arrangement direction, are referred to as "outer terminal portion 414A". The one terminal portion 414 among the three terminal portions 414, which is arranged at the center portion in the arrangement direction, is referred to as "center terminal portion 414B". One of the two conductor exposure portions 416 of the center terminal portion 414B is provided at a portion of the center terminal portion 414B facing the conductor exposure portion 416 of the outer terminal portion 414A arranged at one end portion in the arrangement direction. Another one of the two conductor exposure portions 416 of the center terminal portion 414B is provided at a portion of the center terminal portion 414B facing the conductor exposure portion 416 of the outer terminal portion 414A arranged at another end portion in the arrangement direction. One joining portion 415 is provided between the chamfered portion 419 of each of the two outer terminal portions 414A and the chamfered portion 419 of the center terminal portion 414B. Other configurations are the same as those of any one of the first to third embodiments.

As described above, according to the stator winding 402 for the rotating electric machine 1 of the fourth embodiment of the present invention, the lead wires 409 of the three terminal portions 414 are joined to one another by the two joining portions 415, and the conductors 410 are electrically connected to one another by the plurality of joining portions 415. With this, a joining operation can be reduced.

In the fourth embodiment, description is made of the configuration in which the three terminal portions 414 are joined to one another by the joining portions 415, and the conductors 410 are electrically connected to one another by the joining portions 415. However, there may be adopted a configuration in which four or more terminal portions 414 are joined to one another by joining portions 415, and conductors 410 are electrically connected to one another by the joining portions 415.

Fifth Embodiment

Figure 18:
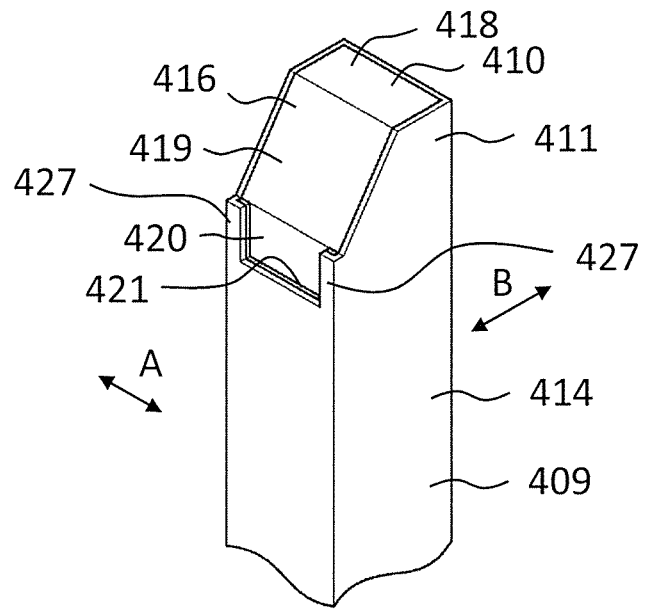
FIG. 18 is a perspective view for illustrating a terminal portion of a stator winding for a rotating electric machine according to a fifth embodiment of the present invention.
Figure 19:
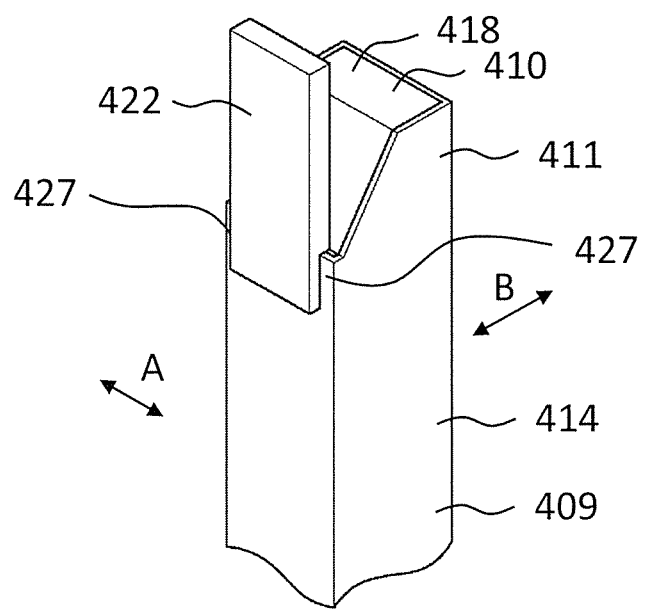
FIG. 19 is a perspective view for illustrating a state in which a joining member is mounted to the terminal portion of FIG. 18.
Figure 20:
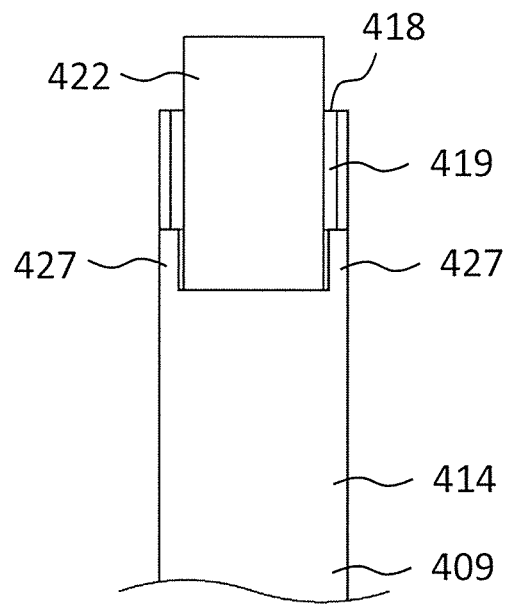
FIG. 20 is a front view for illustrating the terminal portion and the joining member of FIG. 19.
Figure 21:
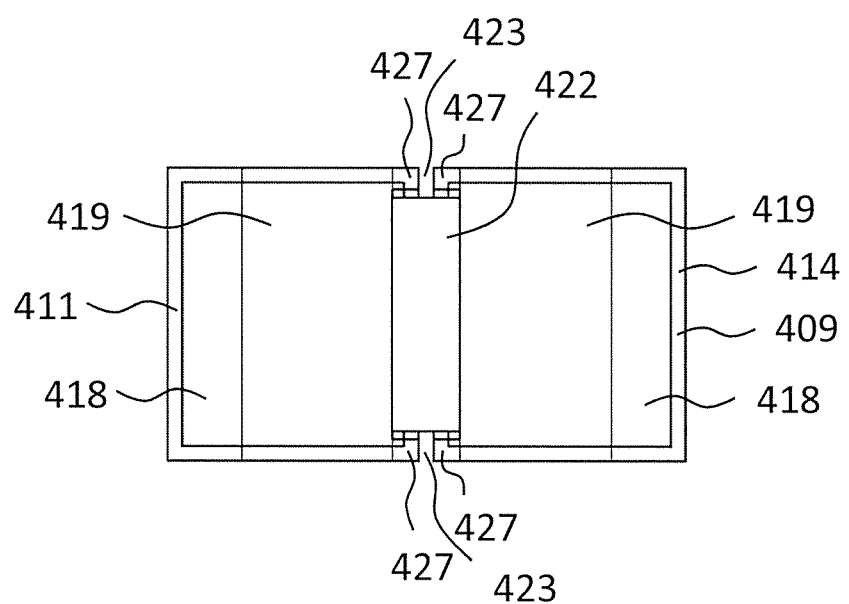
FIG. 21 is a plan view for illustrating two terminal portions held in press contact with each other.

FIG. 18 is a perspective view for illustrating a terminal portion of a stator winding for a rotating electric machine according to a fifth embodiment of the present invention. FIG. 19 is a perspective view for illustrating a state in which a joining member is mounted to the terminal portion of FIG. 18. FIG. 20 is a front view for illustrating the terminal portion and the joining member of FIG. 19. FIG. 21 is a plan view for illustrating a state in which two terminal portions of FIG. 18 are held in press contact with each other. The lead wires 409 further includes a pair of insulating film step portions 427, which are provided on both sides with respect to the planar portion 420 in the width direction A when viewed in a direction perpendicular to the planar portion 420 and have the conductor 410 covered with the insulating film 411. A joining member 422 is sandwiched between the pair of insulating film step portions 427 in the width direction A. A position of the joining member 422 with respect to the terminal portion 414 in the width direction A is restricted by the pair of insulating film step portions 427. Other configurations are the same as those of any one of the first to fourth embodiments.

As described above, according to the stator winding 402 for the rotating electric machine 1 of the fifth embodiment of the present invention, the lead wires 409 each further include the pair of insulating film step portions 427, which are provided on both sides with respect to the planar portion 420 in the width direction A and have the conductor 410 covered with the insulating film 411. With this, arrangement of the joining member 422 biased toward one side in the width direction A is prevented. Thus, quality of the joining portion 415 configured to join the two terminal portions 414 can be stabilized.

Figure 22:
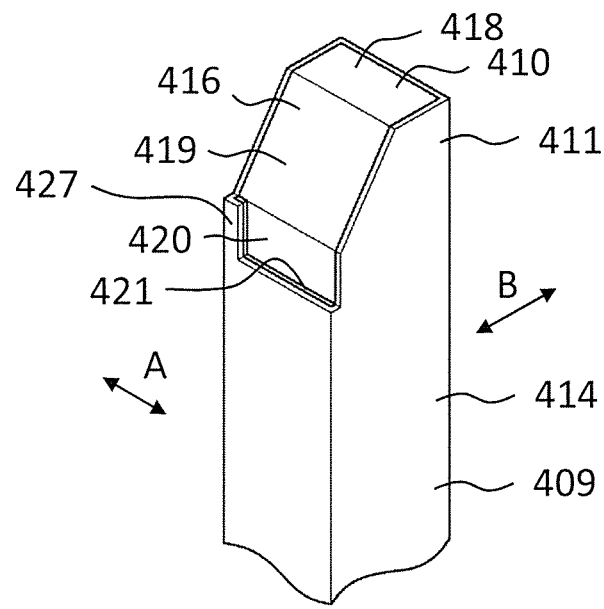
FIG. 22 is a perspective view for illustrating a modification example of the terminal portion.
Figure 23:
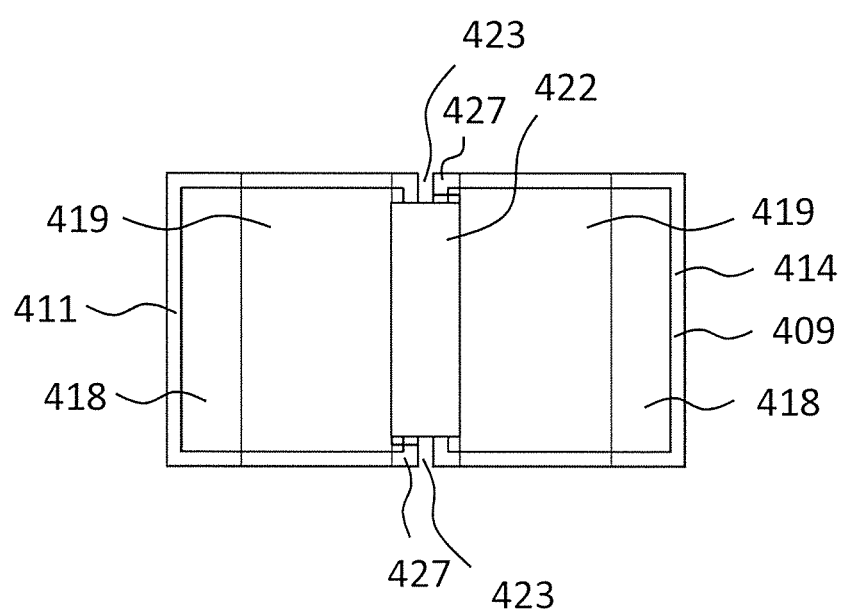
FIG. 23 is a plan view for illustrating a modification example of the two terminal portions held in press contact with each other.

Moreover, in the fifth embodiment, description is made of the configuration in which the insulating film step portions 427 are provided on both sides with respect to the planar portion 420 in the width direction A when viewed in the direction perpendicular to the planar portion 420. However, as illustrated in FIG. 22 and FIG. 23, the lead wire 409 may have a configuration in which the insulating film step portion 427 is provided only on one side with respect to the planar portion 420 in the width direction A when viewed in the direction perpendicular to the planar portion 420. In this case, the joining member 422 is arranged between the insulating film step portion 427 of one terminal portion 414 of the two terminal portions 414 and the insulating film step portion 427 of another the terminal portion 414. Even in this case, the arrangement of the joining member 422 biased with respect to the terminal portion 414 in the width direction A is prevented.

Sixth Embodiment

Figure 24:
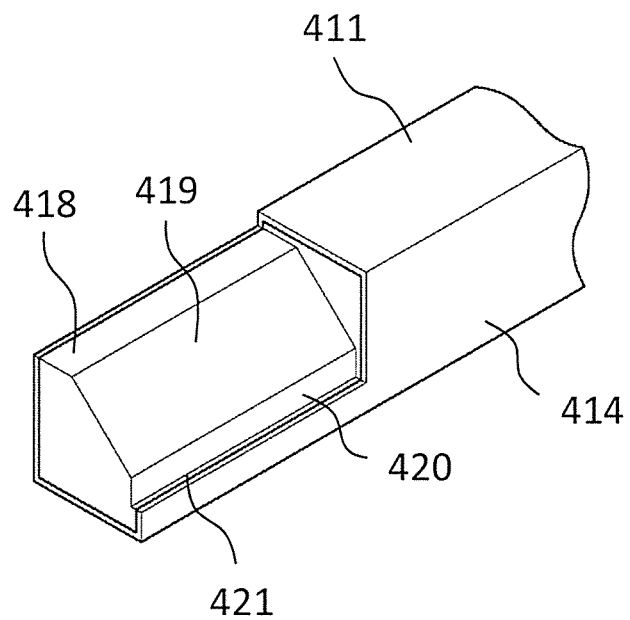
FIG. 24 is a perspective view for illustrating a terminal portion of a stator winding for a rotating electric machine according to a sixth embodiment of the present invention.
Figure 25:
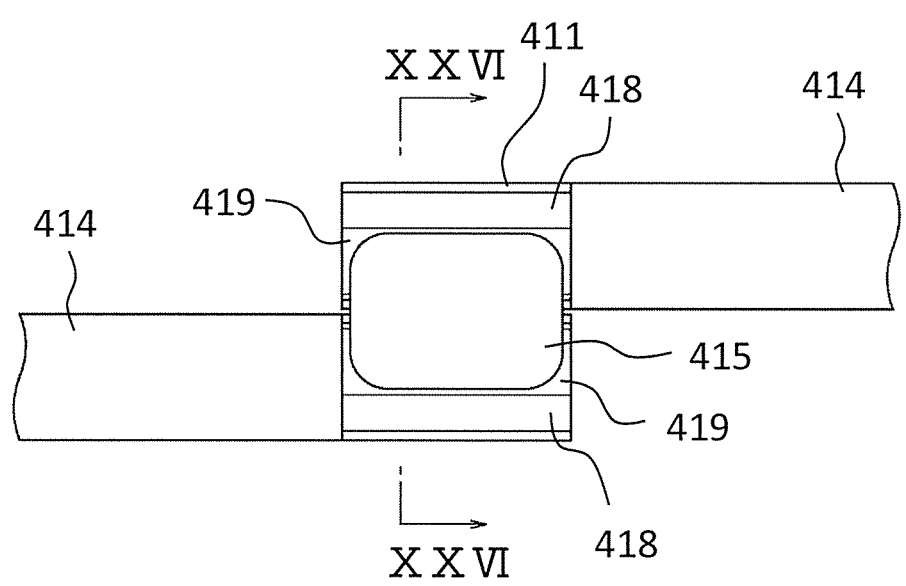
FIG. 25 is a plan view for illustrating two terminal portions joined to each other.
Figure 26:
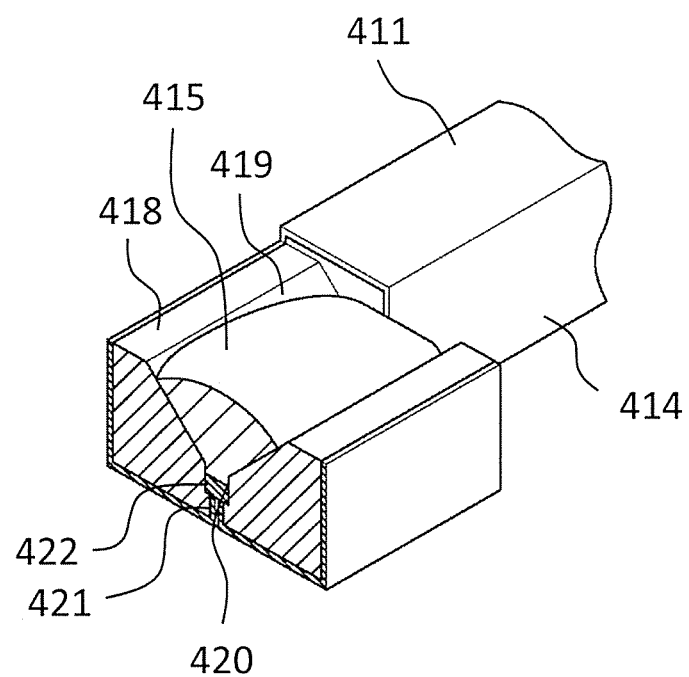
FIG. 26 is a sectional view taken along the line XXVI-XXVI of FIG. 25 as viewed in the direction indicated by the arrows.
Figure 27:
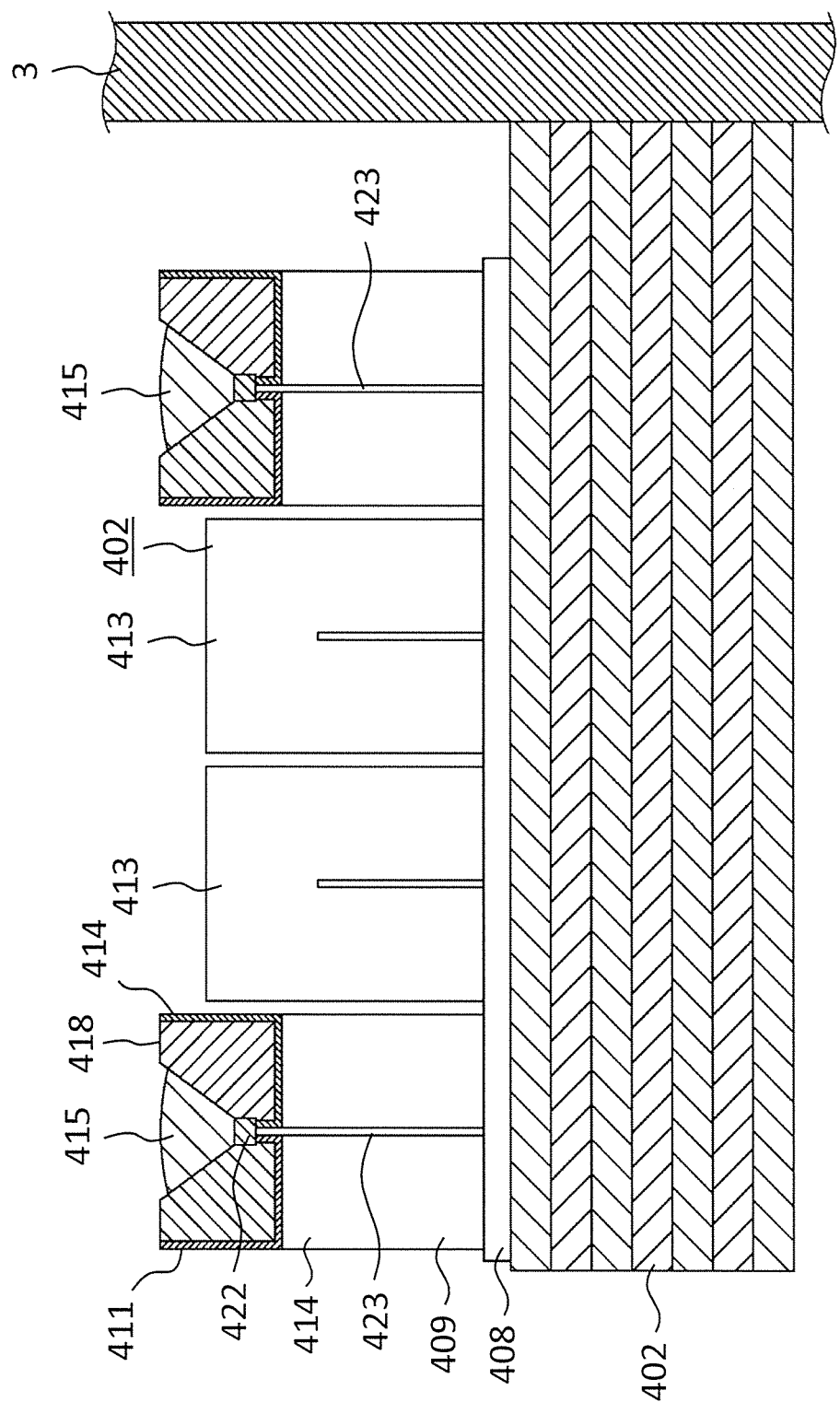
FIG. 27 is a sectional view for illustrating main parts of a stator including two terminal portions joined to each other.

FIG. 24 is a perspective view for illustrating a terminal portion of a stator winding for a rotating electric machine according to a sixth embodiment of the present invention. FIG. 25 is a plan view for illustrating two terminal portions joined to each other. FIG. 26 is a sectional view taken along the line XXVI-XXVI of FIG. 25 as viewed in the direction indicated by the arrows. FIG. 27 is a sectional view for illustrating main parts of the stator 4 including two terminal portions 414 joined to each other. The terminal portions 414 are arranged so as to extend in the direction perpendicular to the axial direction. In this example, the terminal portions 414 are arranged so as to extend in the circumferential direction. The two terminal portions 414 are arranged so as to extend in directions opposite to each other. The two terminal portions 414 are arranged so as to be adjacent to each other in the radial direction. Other configurations are the same as those of any one of the first to fifth embodiments.

As described above, according to the stator winding 402 for the rotating electric machine 1 of the sixth embodiment of the present invention, the plurality of terminal portions 414 are arranged so as to extend in the direction perpendicular to the axial direction of the rotating electric machine 1. With this, regions in which the two terminal portions 414 are adjacent to each other can be increased. As a result, the joining strength of the two terminal portions 414 can be improved.

What is claimed is:

1. A stator winding for a rotating electric machine, comprising:
   a plurality of lead wires each including a conductor and an insulating film provided on side surfaces of the conductor; and
   a joining portion configured to join terminal portions of the plurality of lead wires to each other, to thereby electrically connect the conductors of the plurality of lead wires,
   wherein the plurality of lead wires each include:
      a conductor exposure portion, which is provided at a portion of the terminal portion at which the terminal portions of the plurality of lead wires face each other, has the conductor exposed thereat, and has the joining portion connected thereto; and
      an insulating film remainder portion, which is provided at a portion of the terminal portion of the plurality of lead wires excluding the conductor exposure portion, and has the conductor covered with the insulating film, and
   wherein a portion of the insulating film in the insulating film remainder portion is provided in a periphery of the joining portion,
   wherein the conductor exposure portions provided at portions of the terminal portions facing each other include chamfered portions formed so as to separate away from each other as extending toward a distal end side,
   wherein the joining portion is arranged over the chamfered portions of the conductor exposure portions facing each other,
   wherein the conductor exposure portions provided at portions of the terminal portions facing each other include:
      planar portions, which are provided on a root side with respect to the chamfered portions, and are opposed to each other, and
      step portions, which are provided on a root side with respect to the planar portions, and are oriented toward a distal end side.

2. The stator winding for a rotating electric machine according to claim 1, wherein the joining portion includes an overlay alloy layer formed of alloys of the conductor and the joining member having a melting point lower than a melting point of the conductor.

3. The stator winding for a rotating electric machine according to claim 1, wherein the lead wires each include an insulating film step portion, which is provided on at least one side with respect to the planar portion in the width direction of the lead wire when viewed in a direction perpendicular to the planar portion, and has the conductor covered with the insulating film.

4. The stator winding for a rotating electric machine according to claim 1, wherein the lead wires each include a side surface conductor exposure portion, which is provided at a portion of the terminal portion adjacent to the conductor exposure portion when viewed in a width direction of the lead wire, and has the conductor exposed thereat.

5. The stator winding for a rotating electric machine according to claim 1,
   wherein the terminal portions of three or more arranged wires are joined to one another by a plurality of joining portions, and
   wherein the conductors of the lead wires are electrically connected to one another by the plurality of joining portions.

6. The stator winding for a rotating electric machine according to claim 1, wherein a gap is defined between portions of the plurality of lead wires adjacent to the root side with respect to the joining portions.

7. The stator winding for a rotating electric machine according to claim 1, wherein the terminal portions of the plurality of lead wires are arranged so as to extend in a direction perpendicular to the axial direction of the rotating electric machine.

8. A manufacturing method for a stator winding for a rotating electric machine, which is to be performed to manufacture the stator winding for a rotating electric machine of claim 1, the manufacturing method comprising:
   a pressurizing/holding step of arranging a joining member between the conductor exposure portions of the plurality of lead wires and pressurizing and holding the plurality of lead wires in a direction in which the plurality of lead wires approach each other; and
   an overlaying step of forming the joining portion at the conductor exposure portion by irradiating the joining member with a laser light or an electron beam.

* * * * *